United States Patent [19]

Dorsey

[11] Patent Number: 5,015,718

[45] Date of Patent: May 14, 1991

[54] ADHESIVES AND METHOD FOR MAKING THE SAME

[75] Inventor: George F. Dorsey, Farragut, Tenn.

[73] Assignee: Martin Marietta Energy Systems, Inc., Oak Ridge, Tenn.

[21] Appl. No.: 374,316

[22] Filed: Jun. 30, 1989

[51] Int. Cl.$^5$ .............................................. C08G 18/38
[52] U.S. Cl. ........................................ 528/44; 528/64; 528/87; 528/120
[58] Field of Search ................ 528/44, 64, 87, 120

[56] References Cited

U.S. PATENT DOCUMENTS

| | | | |
|---|---|---|---|
| 3,194,793 | 7/1965 | Kogon | 260/2.5 AM |
| 3,635,851 | 1/1972 | Hoeschele | 260/77.5 |
| 3,987,012 | 10/1976 | Statton | 260/77.5 |
| 4,071,558 | 1/1978 | Bentley | 260/570 D |
| 4,303,773 | 12/1981 | Ganster et al. | 528/64 |
| 4,343,339 | 8/1982 | Schwindt et al. | 152/209 R |
| 4,374,210 | 2/1983 | Ewen et al. | 521/159 |
| 4,446,293 | 5/1984 | Konig et al. | 528/45 |
| 4,459,399 | 7/1984 | Ihrman et al. | 528/64 |
| 4,581,433 | 4/1986 | Potter et al. | 528/64 |
| 4,716,210 | 12/1987 | Trommelmeyer et al. | 528/75 |

*Primary Examiner*—Maurice J. Welsh
*Attorney, Agent, or Firm*—Herman L. Holsopple; Bruce M. Winchell

[57] ABSTRACT

A thermosetting mixture for use as an adhesive, as well as other applications, that is substantially nonmutagenic. This mixture is based upon a thermosetting resin selected from polyurethane and epoxy resins, using an improved curing agent that does not contain mutagenic components. Specifically, the curing agent is a multimixture of substituted alkylanilines produced by an improved process. These alkylanilines are formed by condensation of at least two 2,6-dialkylanilines with a formaldehyde in an acid solution. Upon purification, at least three aromatic diamines are formed that are used for the curing agent with the polyurethane and epoxy resisn. Pot life, green strength and ultimate strength are comparable to adhesives of the prior art that contain mutagenic constituents. Although several dianilines are described, the preferred curing agents are formed using 2,6-diethylaniline (DEA) and 2,6-diisopropylaniline (DIPA), where the mole % of DEA and DIPA is 38–48 and 62–52, respectively. Curing agents within the preferred range have been designated as "Asilamine 4852" and "Asilamine 4555".

17 Claims, 5 Drawing Sheets

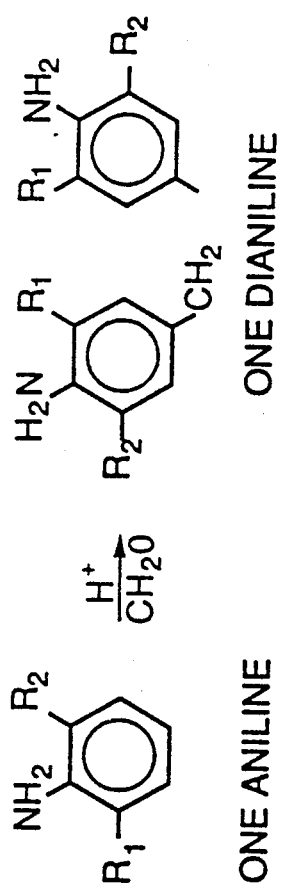
FIG. 1A ONE DIANILINE
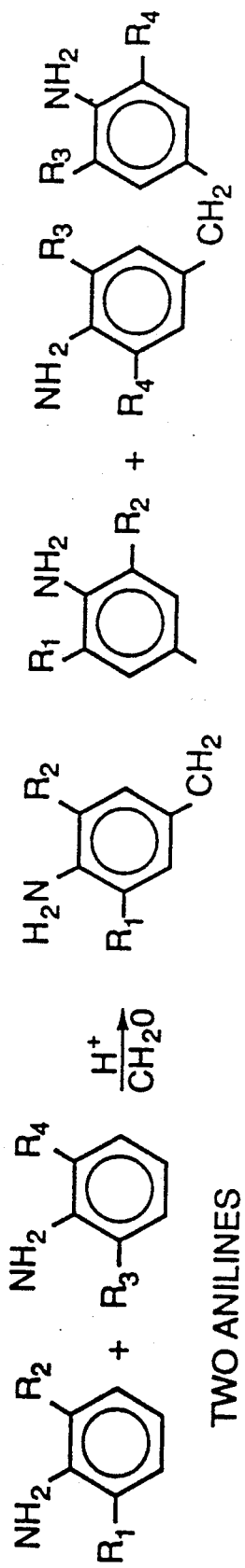
FIG. 1B THREE DIANILINES
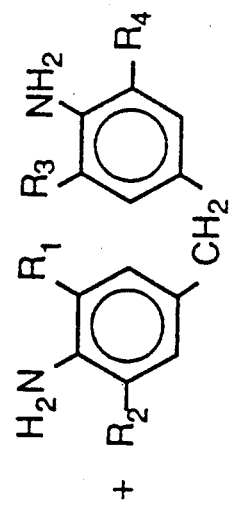
TWO ANILINES

| ACRONYM | CHEMICAL NAME | CHEMICAL FORMULA | | | FORMULA WEIGHT |
|---|---|---|---|---|---|
| | | C | H | N | |
| | REACTANTS | | | | |
| MEA | 2-METHYL-6-ETHYLANILINE | 9 | 13 | 1 | 135.2 |
| MIPA | 2-METHYL-6-ISOPROPYLANILINE | 10 | 15 | 1 | 149.2 |
| DEA | 2,6-DIETHYLANILINE | 10 | 15 | 1 | 149.2 |
| DIPA | 2,6-DIISOPROPYLANILINE | 12 | 19 | 1 | 117.3 |
| | PRODUCTS | | | | |
| MBMEA | 4,4'-METHYLENEBIS (2-METHYL-6-ETHYLANILINE) | 19 | 26 | 2 | 282.4 |
| MBMIPA | 4,4'-METHYLENEBIS (2-METHYL-6-ISOPROPYLANILINE) | 21 | 30 | 2 | 310.5 |
| MEDEA | 4,4'-METHYLENEBIS (2,6-DIETHYLANILINE) | 21 | 30 | 2 | 310.5 |
| MDIPA | 4,4'-METHYLENEBIS (2,6-DIISOPROPYLANILINE) | 25 | 38 | 2 | 366.6 |
| MDIPADIPA | 4,4'-METHYLENE-2,2'6,6'-TRIISOPROPYLANILINE | 22 | 32 | 2 | 324.5 |
| MMEADEA | 4,4'-METHYLENE-2 METHYL-2,6,6'-TRIETHYLDIANILINE | 20 | 28 | 2 | 296.5 |
| MDIPADIPA | 4,4'-METHYLENE-2 METHYL-6-ETHYL-2',6,6'-DIISOPROPYLDIANILINE | 22 | 32 | 2 | 324.5 |
| MMIPADIPA | 4,4'-METHYLENE-2 METHYL-2',6,6'-TRIISOPROPYLDIANILINE | 23 | 34 | 2 | 338.5 |
| MDEADIPA | 4,4'-METHYLENE-2,6 DIETHYL-2',6'-DIISOPROPYLDIANILINE | 23 | 34 | 2 | 338.5 |

FIG. 2

| NOTEBOOK NO. | REACTANTS ACRONYM (mol %) | | PRODUCTS ACRONYM (mol %) | | VISCOSITY (CP) |
|---|---|---|---|---|---|
| 48-34 | DEA | 10 | MEDEA | 1 | 26,000 |
| | DIPA | 90 | MDIPA | 81 | |
| | | | MDEADIPA | 18 | |
| 46-18 | DEA | 60 | MEDEA | 36 | 10,400 |
| | DIPA | 40 | MDIPA | 16 | |
| | | | MDEADIPA | 48 | |
| 48-64 | DEA | 70 | MEDEA | 49 | 700 |
| | DIPA | 30 | MDIPA | 9 | |
| | | | MDEADIPA | 42 | |
| 48-69 | DEA | 90 | MEDEA | 81 | |
| | DIPA | 10 | MDIPA | 1 | |
| | | | MDEADIPA | 18 | |
| 48-73 | DEA | 80 | MEDEA | 64 | |
| | DIPA | 20 | MDIPA | 4 | |
| | | | MDEADIPA | 32 | |
| 48-77 | MEA | 70 | MBMEA | 49 | 14,600 |
| | DIPA | 30 | MDIPA | 9 | |
| | | | MMEADIPA | 42 | |
| 48-81 | MEA | 35 | MBMEA | 12.25 | 7,720 |
| | DEA | 35 | MEDEA | 12.25 | |
| | DIPA | 30 | MDIPA | 9 | |
| | | | MMEADEA | 24.5 | |
| | | | MMEADIPA | 21 | |
| | | | MDEADIPA | 21 | |
| 48-86 | MEA | 90 | MBMEA | 81 | 8,600 |
| | DIPA | 10 | MDIPA | 1 | |
| | | | MMEADIPA | 18 | |
| 48-100 | MEA | 30 | MBMEA | 9 | 52,000 |
| | DIPA | 70 | MDIPA | 49 | |
| | | | MMEADIPA | 42 | |
| 48-95 | MIPA | 50 | MBMIPA | 25 | 154,000 |
| | DIPA | 50 | MDIPA | 25 | |
| | | | MMIPADIPA | 50 | |
| 48-91 | MEA | 10 | MBMEA | 1 | |
| | DEA | 70 | MEDEA | 49 | |
| | DIPA | 20 | MDIPA | 4 | |
| | | | MMEADEA | 14 | |
| | | | MMEADIPA | 42 | |

FIG. 3

ADHESIVES AND METHOD FOR MAKING THE SAME

The U.S. Government has rights to this invention pursuant to Contract No. DEAC-05-84OR21400.

DESCRIPTION

1. Field of Invention

This invention relates generally to adhesives of polyurethane and epoxy types, and more particularly to an improved curing formulation for use with these types of adhesives and to a method of preparing this curing formulation, the curing formulation being nonmutagenic.

2. Background Art

Polyurethane and epoxy type adhesives are used extensively in industry for the joining of metals, (such as iron, steel, aluminum and brass), non-metals (such as glass, ceramics, leather and plastics) and combinations of the same. Currently, the aromatic diamine, 4,4'-methylenedianiline (MDA) is typically used as at least a component for curing agents for these adhesive formulations. Some tests indicate, however, that MDA has carcinogenic characteristics at least in laboratory tests on animals. For this reason, the Occupational Health and Safety Administration (OSHA) has begun a program to determine the degree of risk to human health caused by the use of MDA. It is expected that this study will at least produce regulatory control, with expected increased costs to the adhesive products.

There has been considerable research conducted in the field of improving the quality of polyurethane materials as used for elastomers, coatings and similar applications. Typical of this research is reported in the following U.S. Pat. Nos.: 3,194,793 issued July 13, 1965 to I. C. Kogon; 3,635,851 issued to G. K. Hoeschele on Jan. 18, 1972; 3,987,012 issued to G. L. Statton on Oct. 19, 1976; 4,071,558 issued to F. E. Bentley on Jan. 31, 1978; 4,303,773 (referred to hereinafter as the '773 patent) issued to O. Ganster, et. al. on Dec. 1, 1981; 4,343,339 issued to J. Schwindt, et. al. on Aug. 10, 1982; 4,374,210 issued to J. H. Ewen, et. al. on Feb. 15, 1983; 4,446,293 issued to E. Konig, et. al. on May 1, 1984; 4,459,399 issued to K. G. Ihrman et. al. on July 10, 1984; 4,581,433 (referred to hereinafter as the '433 patent) issued to T. A. Potter, et. al. on Apr. 8, 1986; and 4,716,210 issued to G. Trummelmeyer on Dec. 29, 1987. Of these, the '733 patent and the '433 patent are deemed to be most pertinent to the invention as presented herein.

None of these cited references deals with the problems of producing a suitable adhesive which, among other characteristics, must exhibit a wide range of curing times in that there should be no hardening in the bulk material prior to application, and it needs to be usable as an adhesive in a wide variety of applications. Also, none of these references deals with producing a product that has very low toxicity.

Accordingly, it is an object of the present invention to provide an adhesive system that exhibits substantially no toxicity.

It is another object of the present invention to provide an improved adhesive based upon polyurethane and epoxy systems that has a wide range of curing times.

Another object of the present invention is to provide a method of preparing an improved curing agent for polyurethane and epoxy systems that, when added to the polyurethane or epoxy, produces an improved adhesive with this adhesive characterized by being substantially nonmutagenic, having a wide range of hardening times, and having a strength when hardened at least that of the adhesives of the prior art.

These and other objects and advantages of the present invention will become apparent upon a consideration of the detailed description given hereinafter.

SUMMARY OF INVENTION

In accordance with the present invention, there is provided an improved adhesive composition having a wide range of hardening times, and being substantially nonmutagenic, that is an inter-reacted mixture of about 50 to 95 wt. % of a resin selected from the group consisting of polyurethanes and epoxies, and about 5 to less than about 50 wt. % of a curing formulation containing at least three methylenebis 2,6-dialkyldianilines essentially free of methylenedianiline. Preferably the curing agent is present from about 10 to about 48 wt. %, with this agent selected from the group of aromatic alkyl-substituted methylenedianilines consisting of:

4,4'-methylenebis(2-methyl-6-ethylaniline), {MBMEA}
4,4'-methylenebis(2-methyl-6-isopropylaniline), {MBMIPA}
4,4'-methylenebis(2,6-diethylaniline), {MEDEA}
4,4'-methylenebis(2-ethyl-6-isopropylaniline), {MBEIPA}
4,4'-methylenebis(2-ethyl-6-sec-butylaniline), {MBESBA}
4,4'-methylenebis(2,6-diisopropylaniline), {MDIPA}
4,4'-methylene-2,2'-dimethyl-6-ethyl-6'-isopropyldianiline, {MMEAMIPA}
4,4'-methylene-2-methyl-2,6,6'-triethyldianiline, {MMEADEA}
4,4'-methylene-2-methyl-2',6-diethyl-6'-isopropyldianiline, {MMEAEIPA}
4,4'-methylene-2-methyl-2',6-diethyl-6'-sec-butyldianiline, {MMEAESBA}
4,4'-methylene-2-methyl-6-ethyl-2',6'-diisopropyldianiline, {MMEADIPA}
4,4'-methylene-2-methyl-2',6'-diethyl-6-isopropyldianiline, {MMIPADEA}
4,4'-methylene-2-methyl-2'-ethyl-6,6'-diisopropyldianiline, {MMIPAEIPA}
4,4'-methylene-2-methyl-2'-ethyl-6-isopropyl-6'-sec-butyldianiline, {MMIPAESBA}
4,4'-methylene-2-methyl-2',6,6'-triisopropyldianiline, {MMIPADIPA}
4,4'-methylene-2,2',6-triethyl-6'-isopropyldianiline, {MDEAEIPA}
4,4'-methylene-2,2',6-triethyl-6'-sec-butyldianiline, {MDEAESBA}
4,4'-methylene-2,6-diethyl-2',6'-diisopropyldianiline, {MDEADIPA}
4,4'-methylene-2,2'-diethyl-6-isopropyl-6'-sec-butyldianiline, {MEIPAESBA}
4,4'-methylene-2-ethyl-2',6,6'-triisopropyldianiline, {MEIPADIPA} and
4,4'-methylene-2-ethyl-2',6-diisopropyl-6-sec-butyldianiline. {MESBADIPA}

The acronyms for each of these alkyl-substituted methylenedianilines is indicated in the brackets, { }.

These curing agents are synthesized by the condensation of at least two 2,6-di-alkylanilines with a formaldehyde in an acidic solution (typically sulfuric acid) and an aqueous solvent. The product is neutralized, and then extracted with a water insoluble, amine-compatible, non-acid solvent, such as a chlorinated or fluorinated solvent (e.g., trichloro-trifluoroethane or methylene chloride), ethers or hydrocarbons. Following a water wash to remove all base, the solution is dried yielding a product of at least three alkyldianilines as the curing formulation for the resins.

BRIEF DESCRIPTION OF THE DRAWINGS

FIGS. 1A and 1B illustrate structural equations for illustrating the synthesis of curing formulations useful for the present invention.

FIG. 2 is a table listing the various starting materials and the products formed for use as curing agents for polyurethane and epoxy adhesives.

FIG. 3 is a table listing the mol % of the starting materials identified in FIG. 2, together with the mol % of the various dianalines formed in the reaction indicated in FIG. 1B.

DETAILED DESCRIPTION OF THE INVENTION

Figure 4:
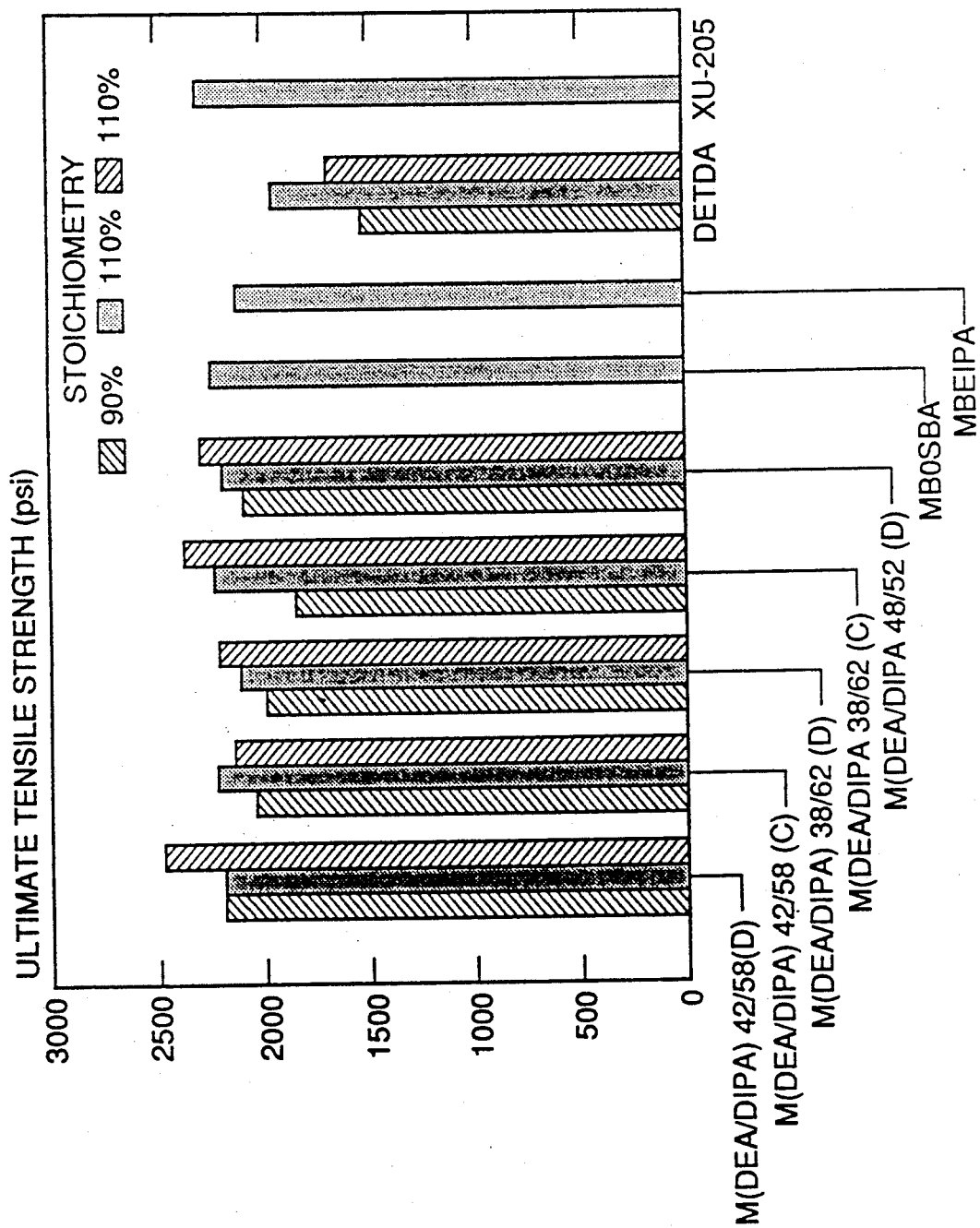
FIG. 4 is a bar graph showing the adhesive strength of formulations of the test curatives with a typical polyurethane base, and comparing that data with the adhesive strength of the formulations using commercial curing agents.

A group of various alkyl-substituted methylene-dianilines has been investigated to determine a suitable substitute for methylenedianine (MDA)-containing curing agents for polyurethene- and epoxy-type adhesives. Certain characteristics were investigated in determining suitable curing agents. These included "pot life" (hardening times) which was evaluated by viscosity measurements, the time to achieve suitable green strength as measured by hardness tests, and adhesive bond strengths as determined by tensile tests on butt-type coupons. These characteristics were determined as a function of mix-ratio variations when used as curing agents for specifically a polyurethane "Halthane 88" obtained from Allied Signal. These characteristics were compared with results for a polyurethene adhesive containing "XU-205" obtained from Ciba-Geigy. XU-205 is reported as containing MDA.

The specific alkyl-substituted methylenedianiles investigated for this purpose were: 4,4'-methylenebis(2-methyl-6-ethylaniline), designated as MBMEA; 4,4'-methylenebis(2-methyl-6-isopropylaniline), designated as MBMIPA; 4,4'-methylenebis(2,6-dithylaniline), designated as MEDEA; 4,4'-methylenebis(2-ethyl-6-isopropylaniline), designated as MBEIPA; 4,4'-methylenebis(2-ethyl-6-sec-butylaniline), designated as MBESBA; 4,4'-methylenebis(2,6-diisopropylaniline), designated as MDIPA; 4,4'-methylene-2,2'-diethyl-6-ethyl-6'-isopropyldianiline, designated as MMEAMIPA; 4,4'-methylene-2,-methyl-2,6,6'-triethyldianiline, designated as MMEADEA; 4,4'-methylene-2-methyl-2',6-diethyl-6'-isopropyldianiline, designated as MMEAEIPA; 4,4'-methylene-2-methyl-2',6-diethyl-6'-sec-butyldianiline, designated as MMEAESBA; 4,4'-methylene-2-methyl-6-ethyl-2',6'-diisopropyldianiline, designated as MMEADIPA; 4,4'-methylene-2-methyl-2',6'-diethyl-6-isopropyldianiline, designated as MMIPADEA; 4,4'-methylene-2-methyl-2'-ethyl-6,6'-diisopropyldianiline, designated as MMIPAEIPA; 4,4'-methylene-2-methyl-2'-ethyl-6-isopropyl-6'-sec-butyldianiline, designated as MMIPAESBA; 4,4'-methylene-2-methyl-2',6,6'-triisopropyldianiline, designated as MMIPADIPA; 4,4'-methylene-2,2',6-triethyl-6'-isopropyldianiline, designated as MDEAEIPA; 4,4'-methylene-2,2',6-triethyl-6'-sec-butyldianiline, designated as MDEAESBA; 4,4'-methylene-2,6-diethyl-2',6'-diisopropyldianiline, designated as MDEADIPA; 4,4'-methylene-2,2'-diethyl-6-isopropyl-6'-sec-butyldianiline, designated as MEIPAESBA; 4,4'-methylene-2-ethyl-2',6,6'-triisopropyldianiline, designated as MEIPADIPA; and 4,4'-methylene-2-ethyl-2',6-diisopropyl-6-sec-butyldianiline, designated as MESBADIPA. Emphasis was on the mixed dianiline series M(DEA/DIPA) x/y where x and y are mole % DEA and DIPA, respectively.

Mix-ratio experiments involved formulations of the amine samples blended with the afore-mentioned polyurethane Halthane 88 in ratios from 90 to 110% of stoichiometric. Viscosities and hardnesses varied predictably with change in mix ratio; however, bond strengths did not change significantly with changes in mix ratio except for the commercial diamine DETDA (Ethyl Corporation) which gave lower strengths and shorter pot life. The test data indicate that the synthesized dianilines, produced as described hereinafter, of M(DEA/DIPA) 38/62 through 48/52, MBESBA and MBEIPA are superior as substitutes for the aforementioned XU-205 in polyurethane formulations. Furthermore, from the standpoint of bond strength, there is no need for a final purification (by distillation, for example) of the formulated dianilines. Of these formulations, the mixed dianiline M(DEA/DIPA) 48/52 appears to be superior to other of the curing agents for the polyurethane-type adhesives. This formulation is designated hereinafter as "Asilamine".

Asilamine is a mixture of three aromatic diamines formed by starting with a mixture of two 2,6-dialkylanilines. Changing the ratios of the alkylaniline starting materials (DEA and DIPA) will cause predictable change in the ratios of the product dianilines and corresponding change in properties. Viscosities of the essentially noncrystallizing Asilamines range from about 9000 mPa to 30,000 mPa as the DEA/DIPA ratio is changed from 48/52 to 10/90. The corresponding amine equivalent weights for the isocyanate reaction range from about 170 to 180 grams/equivalent. The preferred range of ratios for substituting for XU-205-cured polyurethanes (Halthane 88 and Adiprene LW 520 from Uniroyal) is about 48/52 to 45/55 DEA/DIPA. The corresponding products are designated as Asilamine 4852 and as Asilamine 4555, respectively.

These preferred curing agents were prepared by the condensation of at least two alkylanilines with formaldehyde in an acid solution. The preferred source of formaldehyde is selected from the group consisting of formalin solution, methylal and paraformaldehyde. Typically, 37.5% formalin (0.5 mole $CH_2O$ per mole of aniline) was added to the substituted aniline in a solution of sulfuric acid (one mole acid per mole of aniline). Water containing up to 35% isopropanol (about 430 mL solution per mole aniline) was used to maintain the solubility of the aniline salt prior to addition of the formalin. The product was neutralized with a base, such as ammonium hydroxide, to generate the free base, and then extracted with methylene chloride. The organic layer was washed with water until the washings were neutral, then dried (over KOH, $K_2CO_3$, or $Na_2SO_4$).

Methylene chloride was then stripped with a rotary evaporator yielding the product of at least three diamines. Analyses of the products have been made generally with nuclear magnetic resonance and gel permeation chromatography. The following Examples describe typical preparations of curing formulations and adhesives of the present invention.

EXAMPLE 1

A mixture containing 37.68 g (0.213 mole) of DIPA and 12.32 g (0.091 mole) of MEA was dissolved in 15.3 mL of aqueous sulfuric acid (0.304 mole of sulfuric acid). The mixture of the alkylanilines in the sulfuric acid was condensed with 12.3 g of 37.1 wt. % formalin solution. The resulting precipitates of alkyldianiline salts (MBMEA, MDIPA AND MMEADIPA) were neutralized with ammonium hydroxide and then extracted with methylene chloride. These extracts were washed with water until the washings were neutral. The extracts were then dried with anhydrous sodium sulfate and filtered. The methylene chloride was stripped from the extracts with a rotary evaporator, leaving a brown liquid. This liquid weighed 49.6 g, and tests indicated a viscosity of 52,000 cP at a temperature of 25 degrees.

The prepared liquid (2.13 g) was mixed with 13.02 g of a polyurethane prepolymer to provide an adhesive with a pot life of approximately 20 minutes. The adhesive had a time-to-handling strength of 2.5 hours at which time it exhibited a Shore A 30 hardness. The maximum hardness of the adhesive was about 97 Shore A.

EXAMPLE 2

A mixture containing 21.86 g (0.146 mole) of DEA and 28.14 g (0.159 mole) of DIPA was dissolved in 15.4 mL (0.305 mole) sulfuric acid dissolved in a solution of 35 wt. % isopropanol in water. The mixture of the alkylanilines in sulfuric acid was condensed with 12.4 g of 37.1 wt. % formalin solution. The resulting precipitated alkyldianiline salts of MEDEA, MDIPA, and MDEADIPA were neutralized with ammonium hydroxide, and extracted with trifluorotrichloroethane. The extracts were washed with water until the washings were neutral. The extracts were then dried with anhydrous sodium sulfate and filtered. The trifluorotrichloroethane was stripped with a rotary evaporator leaving a brown liquid weighing 50.3 g (97% of theoretical) with a viscosity of 9500 cP at 25° C.

The prepared liquid (4.01 g) was mixed with 5.34 g of an epoxy resin (based on resorcinol) to provide an adhesive with a pot life of 21 hours. When cured for 8 hours at 130° C. the adhesive had a hardness of 87 Shore D and a glass transition temperature of 123° C. by differential scanning calorimetry.

FIGS. 1A and 1B illustrate the structural equations for the synthesis. In FIG. 1A is shown the results of reacting only one starting material showing that only one dianiline will be formed. However, if two alkylaniline starting materials are present, as illustrated in FIG. 1B, then three different dianilines will be formed. Further, it can be shown that where three starting materials of this type are used, there will be six different aromatic diamines in the product. This is a very effective way to add variety of dianilines in the product and thus force lower melting points.

In FIG. 2 is a table of the various reactants used in the present study together with the reaction products. The acronym, the chemical formula and formula weight are given for each. Then in FIG. 3 is a table showing the mol % of the starting materials and the mol % of the individual diamines in the various products. Also shown in the FIG. 3 is the viscosity of the mixed product. A comparison of adhesive strengths for mixtures of eight test curing agents, when added to Halthane 88, is shown in the bar graph of FIG. 4. It can be seen that the preferred ones of the synthesized dianalines produce an adhesive having strengths substantially equal to that of the common commercial curatives (DETDA and XU-205). All of the mixtures shown in these data had ultimate tensile strengths of about 2000 psi.

Figure 5:
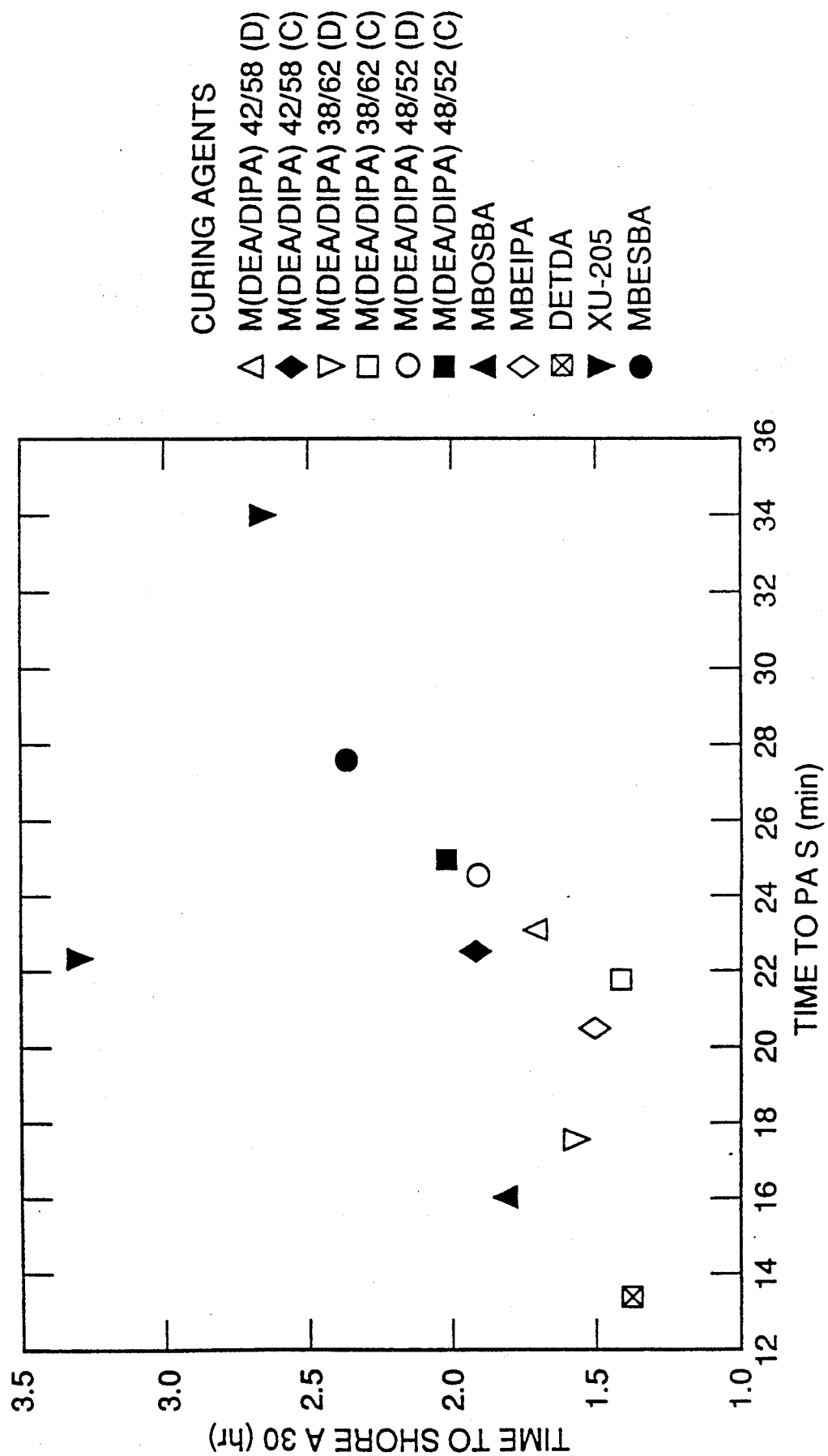
FIG. 5 is a plot of the pot life of several formulations using the test curing agents with the same typical polyurethane base, and comparing that data with the pot life of formulations using commercial curing agents.

The pot life versus time to handling strength (green strength) for the same formulations is plotted in FIG. 5. Except for the formulation using XU-205 which produced slightly longer pot life, all of the preferred formulations provided an adequate pot life, generally 18 to 28 minutes, and a time to handling between 1.5 and 2 hours. This time is considered to be very satisfactory for nearly all known adhesive applications.

Of primary importance to the development of a new adhesive formulation is the lack of toxicity. It has been shown that MDIPA and all of the 2,6 dialkyl substituted methylenedianilines are nonmutagenic in the standard Ames Test, and to have a lower order of acute toxicity than the corresponding aniline and 2-alkylaniline derivatives such as the aforementioned MDA and curatives containing MDA. In tests with mice, the oral dose LD/50 is 3.6 g Asilamine aromatic diamine per kilogram of body weight. In addition, these curing agents were found to be nonirritating to the eyes of rabbits, and to the skin of rabbits and guinea pigs.

Asilamine was tested in a second tier mutagenicity experiment, specifically the Chinese Hamster ovary cell/hypoxanthene-guanine phosphoribosyl transferase assay test (the CHO test). It was important to test the Asilamine in this way since the toxicology community, in general, ascribes a high probability that a material will not be carcinogenic if it shows negative at two levels of mutagenenicity testing, and it had already shown negative to the Ames Test, which is a first level test. The results of the CHO test indicate that Asilamine and MEDEA, one of the components of Asilamine, are not mutagenic. The probability is high, therefore, that Asilamine will not be carcinogenic in animal testing.

The adhesive strengths indicated in FIG. 4 were for butt joints using aluminum. Additional tests were made with substrates of beryllium, depleted uranium, tantalum-10% tungsten and type 304L stainless steel. Butt tensile strength measurements were made at 5, 11, 32 and 89 days of cure. Results with a polyurethane resin (Halthane 88) cured with Asilamine indicate that this adhesive can be substituted for known adhesive materials previously in use.

The majority of testing of the curing agents described herein has been in a polyurethane resin system. This has occurred because of the ready availability of the resin. However, the same curatives are useful with epoxy resins. Typical resins are Epon 826 and Epon 828 available from Shell Chemical. Other examples of useful epoxy resins are D.E.R. 331 and D.E.R. 332 from Dow Chemical, glycidylamine epoxy resins such as Araldite MY0510 and Araldite MY721 from Ciba-Geigy, and resorcinol diglycidyl ether such as Heloxy 69 from Wilmington Chemical Co. Results corresponding well with those of the polyurethane system have been demonstrated in the epoxy systems.

In addition to adhesive applications, polurethanes cured with Asilamine aromatic diamine curing agents can be used in coatings, paint and ink formulations, binders for abrasives in grinding applications, encapsulation, and cast articles. Epoxy resins cured with Asilamine aromatic diamine curing agents will have improved toughness and high temperature resistance especially useful in adhesives and composite applications, such as filament winding.

From the foregoing, it will be understood by persons versed in the art that a group of improved polyurethane and epoxy formulations have been developed that have physical properties at least equal to those of the prior art. However, these improved formulations have the beneficial characteristic of being substantially nonmutagenic. While only specific formulations are given, this is not for the purpose of limitation of the invention. Rather, the invention is to be limited only by the appended claims and their equivalents.

I claim:

1. An improved and nonmutagenic adhesive, which comprises:
   a thermosetting resin selected from polyurethane resins and epoxy resins; and
   a curing agent intimately mixed with said thermosetting resin, said curing agent being a mixture of at least three aromatic diamines formed by the condensation of at least two 2,6-dialkylanilines with a formaldehyde in an acid solution, and stripping said aromatic diamines from said solution for use with said thermosetting resin, said curing agent being present about 5 to less than about 50 wt. % in said intimate mixture.

2. The adhesive of claim 1 wherein said aromatic diamines of curing agent are selected from the group consisting of:
   4,4'-methylenebis(2-methyl-6-Ethyaniline),
   4,4'-methylenebis(2-methyl-6-isopropylaniline),
   4,4'-methylenebis(2,6-diisopropylaniline),
   4,4'-methylenebis(2-ethyl-6-isopropylaniline),
   4,4'-methylenebis(2-ethyl-6-sec-butylaniline),
   4,4'-methylenebis(2,6-diisopropylaniline)
   4,4'-methylene-2,2'-dimethyl-6-ethyl-6'-isopropyldianiline,
   4,4'-methylene-2,-methyl-2,6,6'-triethyldianiline,
   4,4'-methylene-2-methyl-2',6-diethyl-6'-isopropyldianiline,
   4,4'-methylene-2-methyl-2',6-diethyl-6'-sec-butyldianiline,
   4,4'-methylene-2-methyl-6-ethyl-2',6'-diisopropyldianiline,
   4,4'-methylene-2-methyl-2',6'-diethyl-6-isopropyldianiline,
   4,4'-methylene-2-methyl-2'-ethyl-6,6'-diisopropyldianiline,
   4,4'-methylene-2-methyl-2'-ethyl-6-isopropyl-6'-sec-butyldianiline,
   4,4'-methylene-2,-methyl-2',6,6'-triisopropyldianiline,
   4,4'-methylene-2,2',6-triethyl-6'-isopropyldianiline,
   4,4'-methylene-2,2',6-tritehyl-6'-sec-butyldianiline,
   4,4'-methylene-2,6-diethyl-2',6'-diisopropyldianiline,
   4,4'-methylene-2,2'-diethyl-6-isopropyl-6'-sec-butyldianiline,
   4,4'-methylene-2-ethyl-2',6,6'-triisopropyldianiline, and
   4,4'-methylene-2-ethyl-2',6-diisopropyl-6-sec-butyldianiline.

3. The adhesive of claim 1 wherein said 2,6-dialkylanilines are 2,6-diethylaniline (DEA) and 2,6-diisopropylaniline (DIPA).

4. The method of claim 1 wherein said formaldehyde is selected from the group consisting of formalin solution, methylal and paraformaldehyde.

5. A method for the preparation of an improved and nonmutagenic adhesive which comprises the steps:
   preparing a curing agent by
   a. condensing at least two 2,6-dialkylanilines with a formaldehyde in an aqueous acid solution in the presence of an alcohol to form at least three methylenebis2,6-dialkyldianilines,
   b. neutralizing said solution to generate a free base,
   c. recovering said at least three methylenebis2,6-dialkyldianilines with an extractant,
   d. washing said recovered material with an aqueous wash,
   e. drying said recovered material, and
   f. stripping said extractant from said dried material to produce said curing agent; and
   preparing an intimate mixture of said curing agent with a thermosetting resin selected from the group consisting of polyurethane resins and epoxy resins wherein said curing agent is from about 5 to less than about 50 wt. % of said intimate mixture.

6. The method of claim 5 wherein said formaldehyde is selected from the group consisting of formalin solution, methylal and paraformaldehyde.

7. The method of claim 5 wherein said aqueous acid solution is a sulfuric acid solution having about one mole $H_2SO_4$ per mole aniline, said alcohol is 35% isopropanol, said neutralization is carried out with ammonium hydroxide, and said extractant is a water-insoluble, amine-compatible non-acidic solvent.

8. The method of claim 7 wherein said water insoluble extractant is selected from the group consisting of chlorinated solvents, fluorinated solvents, ethers, hydrocarbons and mixtures thereof.

9. The method of claim 5 wherein said methylenebis2,6-dialkyldianilines of said curing agent are selected from the group consisting of:
   4,4'-methylenebis(2-methyl-6-Ethyaniline),
   4,4'-methylenebis(2-methyl-6-isopropylaniline),
   4,4'-methylenebis(2,6-diisopropylaniline),
   4,4'-methylenebis(2-ethyl-6-isopropylaniline),
   4,4'-methylenebis(2-ethyl-6-sec-butylaniline),
   4,4'-methylenebis(2,6-diisopropylaniline)
   4,4'-methylene-2,2'-dimethyl-6-ethyl-6'-isopropyldianiline,
   4,4'-methylene-2,-methyl-2,6,6'-triethyldianiline,
   4,4'-methylene-2-methyl-2',6-diethyl-6'-isopropyldianiline,
   4,4'-methylene-2-methyl-2',6-diethyl-6'-sec-butyldianiline,
   4,4'-methylene-2-methyl-6-ethyl-2',6'-diisopropyldianiline,
   4,4'-methylene-2-methyl-2',6'-diethyl-6-isopropyldianiline,
   4,4'-methylene-2-methyl-2'-ethyl-6,6'-diisopropyldianiline,
   4,4'-methylene-2-methyl-2'-ethyl-6-isopropyl-6'-sec-butyldianiline,
   4,4'-methylene-2,-methyl-2',6,6'-triisopropyldianiline,
   4,4'-methylene-2,2',6-triethyl-6'-isopropyldianiline,
   4,4'-methylene-2,2',6-triethyl-6'-sec-butyldianiline,
   4,4'-methylene-2,6-diethyl-2',6'-diisopropyldianiline, 4,4'-methylene-2,2'-diethyl-6-isopropyl-6'-sec-butyl-dianiline,
4,4'-methylene-2-ethyl-2',6,6'-triisopropyldianiline, and
4,4'-methylene-2-ethyl-2',6-diisopropyl-6-sec-butyl-dianiline.

10. The method of claim 5 wherein said 2,6-dialkylanilines are 2,6-diethylaniline (DEA) and 2,6-diisopropylaniline (DIPA).

11. The method of claim 10 wherein said DEA is present between about 38 and 48 mole %, and said DIPA is present between about 52 to 62 mole %.

12. A method for the preparation of an improved and nonmutagenic adhesive, which comprises the steps:
preparing a curing agent by
 a. condensing at least two 2,6-dialkylanilines in an aqueous acid solution with a formaldehyde selected from the group consisting of formalin solution, methylal and paraformaldehyde, in the presence of an alcohol to form at least three methylenebis2,6-dialkyldianilines,
 b. neutralizing said solution with ammonium hydroxide to generate a free base,
 c. recovering said at least three methylenebis2,6-dialkyldianilines with a water-insoluble, amine-compatible, non-acidic solvent,
 d. washing said recovered material with an aqueous wash,
 e. drying said recovered material, and
 f. stripping said solvent to produce said curing agent; and
preparing an intimate mixture of said curing agent with a thermosetting resin selected from the group consisting of polyurethane resins and epoxy resins wherein said curing agent is from about 5 to less than about 50 wt. % of said intimate mixture.

13. The method of claim 12 wherein said aqueous acid solution is a sulfuric acid solution having about one mole $H_2SO_4$ per mole aniline and said alcohols 35% isopropanol.

14. The method of claim 12 wherein said 2,6-dialkylanilines are 2,6-diethylaniline (DEA) and 2,6-diisopropylaniline (DIPA).

15. The method of claim 14 wherein said DEA is present between about 38 and 48 mole %, and said DIPA is present between about 52 and 62 mole %.

16. The method of claim 12 wherein solvent is selected from the group consisting of chlorinated solvents, fluorinated solvents, ethers, hydrocarbons and mixtures thereof.

17. The method of claim 12 wherein said curing agent is selected from the group consisting of:
4,4'-methylenebis(2-methyl-6-Ethylaniline),
4,4'-methylenebis(2-methyl-6-isopropylaniline),
4,4'-methylenebis(2,6-diisopropylaniline),
4,4'-methylenebis(2-ethyl-6-isopropylaniline),
4,4'-methylenebis(2-ethyl-6-sec-butylaniline),
4,4'-methylenebis(2,6-diisopropylaniline)
4,4'-methylene-2,2'-dimethyl-6-ethyl-6'-isopropyl-dianiline,
4,4'-methylene-2,-methyl-2,6,6'-triethyldianiline,
4,4'-methylene-2-methyl-2',6-diethyl-6'-isopropyl-dianiline,
4,4'-methylene-2-methyl-2',6-diethyl-6'-sec-butyl-dianiline,
4,4'-methylene-2-methyl-6-ethyl-2',6'-diisopropyl-dianiline,
4,4'-methylene-2-methyl-2',6-diethyl-6-isopropyl-dianiline,
4,4'-methylene-2-methyl-2'-ethyl-6,6'-diisopropyl-dianiline,
4,4'-methylene-2-methyl-2'-ethyl-6-isopropyl-6'-sec-butyldianiline,
4,4'-methylene-2,-methyl-2',6,6'-triisopropyldianiline,
4,4'-methylene-2,2',6-triethyl-6'-isopropyldianiline,
4,4'-methylene-2,2',6-triethyl-6'-sec-butyldianiline,
4,4'-methylene-2,6-diethyl-2',6'-diisopropyldianiline,
4,4'-methylene-2,2'-diethyl-6-isopropyl-6'-sec-butyl-dianiline,
4,4'-methylene-2-ethyl-2',6,6'-triisopropyldianiline, and
4,4'-methylene-2-ethyl-2',6-diisopropyl-6-sec-butyl-dianiline.

* * * * *

UNITED STATES PATENT AND TRADEMARK OFFICE
CERTIFICATE OF CORRECTION

PATENT NO. : 5,015,718
DATED : May 14, 1991
INVENTOR(S) : George F. Dorsey

It is certified that error appears in the above-identified patent and that said Letters Patent is hereby corrected as shown below:

In claim 2 (column 7, line 37), please correct the spelling of the term --4,4'-methylenebis(2-methyl-6-ethylaniline)--.

Also in claim 2 (column 7, line 39), please delete the term "4,4'-methylenebis(2,6-diisopropylaniline)" and substitute the term --4,4'-methylenebis(2,6-diethylaniline)-- therefor.

In claim 9 (column 8, line 45), please delete the term "4,4'-methelynebis(2,6-diisopropylaniline)" and substitute the term --4,4'-methylenebis(2,6-diethylaniline)-- therefor.

In claim 17 (column 10, line 15), please delete the term "4,4'-methylenebis(2,6-diisopropylaniline)" and substitute the term --4,4'-methylenebis(2,6-diethylaniline)-- therefor.

Signed and Sealed this

Eleventh Day of October, 1994

Attest:

BRUCE LEHMAN

Attesting Officer

Commissioner of Patents and Trademarks